C. T. FRIEDRICH.
VEHICLE ATTACHMENT.
APPLICATION FILED AUG. 26, 1910.

1,034,993.

Patented Aug. 6, 1912.
2 SHEETS—SHEET 1.

Witnesses

Inventor
Carl T. Friedrich,

By Victor J. Evans
Attorney

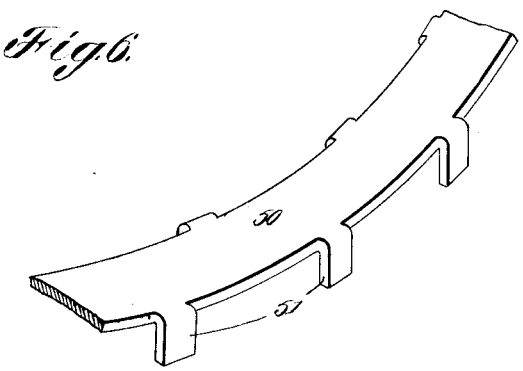
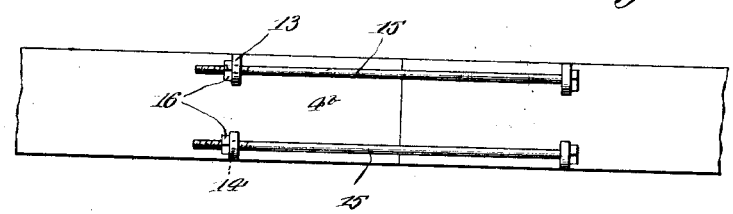
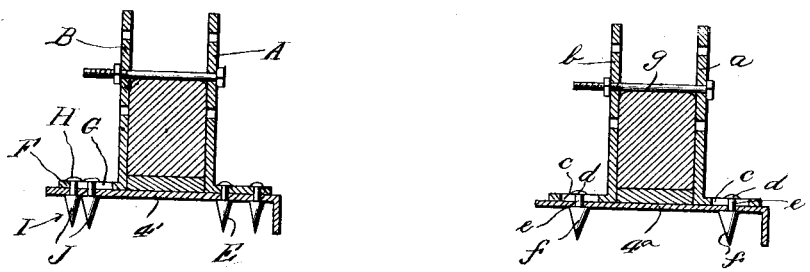

UNITED STATES PATENT OFFICE.

CARL T. FRIEDRICH, OF ATKINSON, NEBRASKA.

VEHICLE ATTACHMENT.

1,034,993.　　　　Specification of Letters Patent.　　Patented Aug. 6, 1912.

Application filed August 26, 1910. Serial No. 579,001.

*To all whom it may concern:*

Be it known that I, CARL T. FRIEDRICH, a citizen of the United States, residing at Atkinson, in the county of Holt and State of Nebraska, have invented new and useful Improvements in Vehicle Attachments, of which the following is a specification.

This invention relates to certain improvements in supplemental wide tires for vehicle wheels, and the primary object of the invention is to provide a device of this class which may be easily and quickly applied to the felly of an ordinary wheel or detached therefrom when not in use.

With the above, and other objects in view, which will appear as the description progresses, the invention resides in the novel construction and combination of parts hereinafter fully described and claimed.

Figure 1:
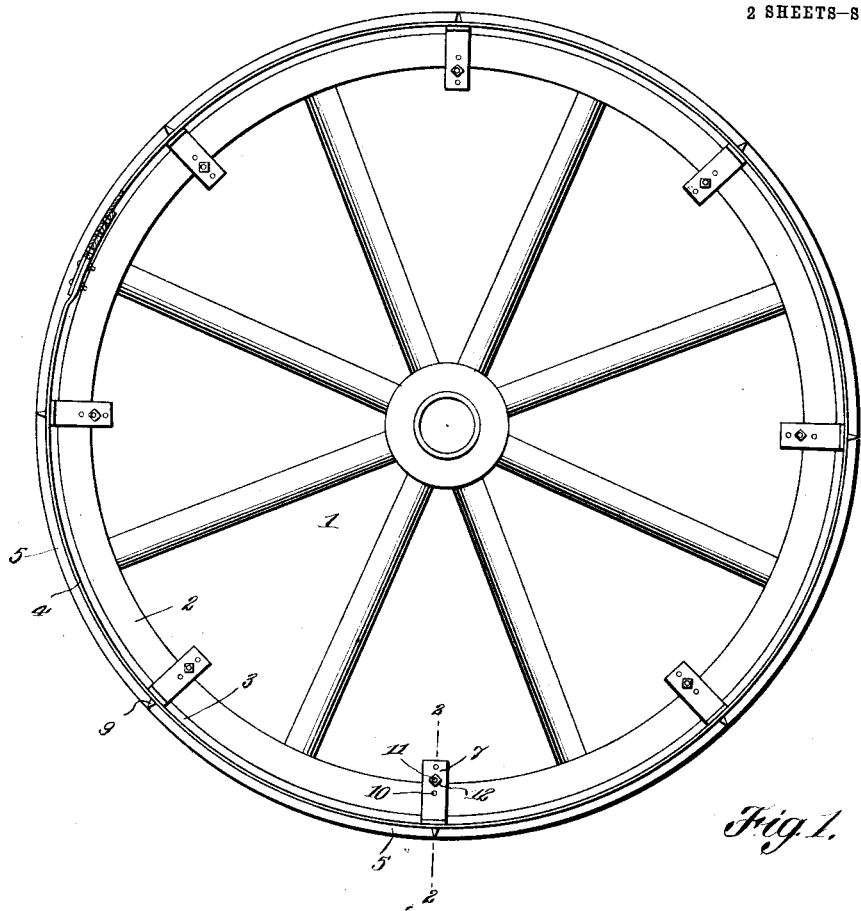
Figure 2:
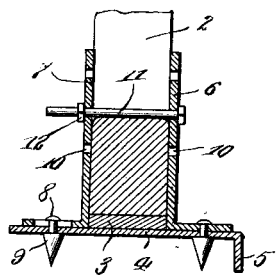
Figure 3:
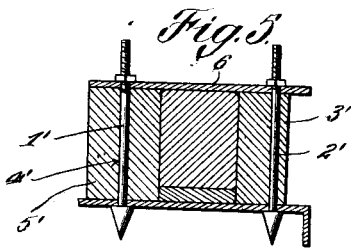

In the accompanying drawings, Figure 1 is a side elevation of an ordinary vehicle wheel provided with the improved supplemental tire. Fig. 2 is a sectional view upon the line 2—2 of Fig. 1. Fig. 3 is a similar sectional view illustrating a modified form for attaching the supplemental tire to the felly. Fig. 4 is a similar view of a still further modified form. Fig. 5 is a similar view of a further modification. Fig. 6 is a perspective view of a portion of a modified form of the supplemental tire. Fig. 7 is a detail elevation illustrating one manner of connecting the ends of tire sections.

It is very expensive for farmers and others to keep two sets of wagons with the ordinary narrow tire for hard roads and with the very wide tire for use on soft land such as fields, etc., or when the roads are very muddy as in wet weather or in early spring.

To adapt the ordinary narrow tire vehicle wheels for use on soft ground, very wide removable supplemental tires have been provided which may be easily clamped around the ordinary vehicle wheel or can be removed therefrom when necessary.

The ordinary wagon wheels vary in diameter and width of tire; also the fact that the narrow wheels and tires wear round or convex in cross section presents certain difficulties which have to be taken into consideration in supplying wide supplemental tires applicable to all classes of wagon wheels.

It is the primary object of the present invention to provide an improved wide supplemental tire exceedingly easy of adjustment to all kinds of wagon wheels, within varied limits as to diameter of wheel and width of wheel tires.

In the drawing the numeral 1 designates an ordinary vehicle wheel. This wheel is, of course, provided with the ordinary felly 2 and tire 3.

The numeral 4 designates the improved supplemental tire. This supplemental or wide tire may be constructed of one or a plurality of sections and preferably has one of its edges bent outwardly to provide an annular rib or flange 5.

In the device illustrated in Figs. 1 and 2 of the drawings the numerals 6 and 7 designate a pair of substantially L-shaped members, one of which being rigidly connected with the supplemental tire 4. The opposite member 7, has its offset portion which engages with the inner face of the supplemental tire 4 provided with a longitudinally extending slot 8. The numeral 9 designates a headed member which is adapted to engage the walls adjacent the said longitudinal slot 8, so that the member 7 may be free to move toward or away from the member 6 to adapt itself to the various widths of the vehicle fellies. Both of the upright portions of the members 6 and 7 are provided with a plurality of alining openings 10, the same being adapted for the reception of a bolt 11 having a nut 12. By this arrangement, it will be readily noted that the member 7 may be effectively secured to vehicle fellies of various widths and thicknesses.

In the device illustrated in Fig. 1 the tire 4 is constructed of a single member and has one of its ends overlapping so that the said tire may be readily adjusted to the various sizes of vehicle wheels. The overlapping ends may be connected together in any desired or preferred manner, and in this instance the said overlapping portions are provided with a plurality of alining openings, the same being adapted for the reception of threaded bolts and nuts therefor.

In Fig. 3 there is illustrated a slightly modified form of attaching the device to the felly of an ordinary wheel. This construction is similar to that described in connection with Fig. 1, and provides a pair of substantially L-shaped members A and B. The offset foot of the member A engaging the tire 4' is connected to the said tire through the medium of a pair of bolts. These bolts have their outer faces projecting through the tire so as to provide spurs E which are adapted to serve as an additional means for preventing the slipping of the tire. The opposite L-shaped member B has its offset portion F provided with a longitudinal extending slot G, and the walls adjacent this slot are engaged by the headed portions H of a pair of bolts or securing members I. These securing members are also adapted to extend through the supplemental tire so as to provide spurs J. The vertical portions of both of the members are provided with a plurality of spaced openings, the latter being adapted for the reception of a removable bolt and a nut therefor. In Fig. 4 the securing elements comprise a pair of L-shaped members $a$ and $b$. The portions of the L-shaped members engaging the supplemental tire $4^a$ are each provided with longitudinally extending cut away portions $c$, and the walls adjacent these cut away portions are engaged by heads $d$ of bolt members $e$. The bolt members $e$ also extend below the outer face of the tire $4^a$ to provide the spurs $f$. The vertical portions of these members $a$ and $b$ are provided with a plurality of spaced alining openings, the latter being adapted for the reception of the removable securing element $g$.

In Fig. 5 a still further method of securing the supplemental tire to the vehicle wheel is illustrated. In this figure the tire is provided with a pair of inwardly projecting spaced bolts $1'$ and $2'$. The bolt $2'$ is connected with an eccentric roller $3'$. The bolt $1'$ is mounted within a longitudinally extending slot $4'$ provided by a block $5'$. Both of the bolts $1'$ and $2'$ are connected with a flexible strip $6'$ and are secured thereto through the medium of bolts $7'$. It will also be noted that after the eccentric roller is put in contact with the felly of a wheel it will clamp the wide bar to the felly tighter and tighter as the tendency of the same to slip is increased.

In Fig. 6 I have illustrated a slightly modified form of the supplemental tire. In this figure the longitudinal edges of the said tire are provided with a plurality of spaced spurs or lips which are preferably formed integral with the tire, thus doing away with the necessity of turning one or both of the edges outwardly of the tire as described in connection with the remaining figures of the drawing.

In Fig. 7 there is illustrated a means for connecting the ends of the tire or sections of the tire. In this view each of the tire sections are provided with lips 13. These lips 13 are each provided with suitable openings 14, the said openings being adapted for the reception of bolt members 15. These bolts 15 have one of their ends threaded, and the said threaded portions are adapted for the reception of nuts 16.

From the above description it will be noted that by providing the horizontal portions of the L-shaped members with elongated slots and by providing the spurs with the shanks which terminate in the heads which engage with the walls of the said horizontal portions of the L-shaped members adjacent the said slots, the said L-shaped members may be moved laterally of the tie and the off-set or vertical portions of the said L-shaped members being provided with the registering openings and with the securing elements for the said openings, the felly of the wheel may be effectively clasped between the said L-shaped members.

Having thus fully described the invention, what I claim as new is:—

In combination with a vehicle wheel, a wide tire for the said wheel, L-shaped members, the base portions of said L-shaped members being provided with longitudinal slots, spurs having reduced shanks, the same passed through the wide tire and the slots in the L-shaped members, whereby the L-shaped members may be shifted laterally so that the said wide tire may be secured to fellies of different widths, and the vertical portions of the L-shaped members being provided with a plurality of alining apertures, a bolt passed through a pair of the apertures, thereby holding the L-shaped members in adjusted position.

In testimony whereof I affix my signature in presence of two witnesses.

CARL T. FRIEDRICH.

Witnesses:
E. J. MACK,
ED TOMSIK.